(12) United States Patent
van Zuilekom

(10) Patent No.: US 8,336,497 B2
(45) Date of Patent: Dec. 25, 2012

(54) SMALL ANIMAL TOILET PAD

(76) Inventor: Linda Joy van Zuilekom, Houston, TX (US)

( * ) Notice: Subject to any disclaimer, the term of this patent is extended or adjusted under 35 U.S.C. 154(b) by 626 days.

(21) Appl. No.: 11/336,513

(22) Filed: Jan. 20, 2006

(65) Prior Publication Data

US 2007/0169707 A1    Jul. 26, 2007

(51) Int. Cl.
*A01K 29/00* (2006.01)

(52) U.S. Cl. .......................... 119/169; 119/165; 119/168

(58) Field of Classification Search .................. 119/169, 119/165, 166, 167, 168, 170, 171, 172, 161; D30/161

See application file for complete search history.

(56) References Cited

U.S. PATENT DOCUMENTS

| | | | | |
|---|---|---|---|---|
| 1,773,141 | A * | 8/1930 | Hodgson | 119/165 |
| D214,739 | S * | 7/1969 | Freeborn | D30/161 |
| 3,626,899 | A | 12/1971 | Spellman | |
| 3,721,803 | A * | 3/1973 | DiStefano | 219/387 |
| D237,392 | S * | 10/1975 | Freebom | D30/161 |
| 4,774,907 | A * | 10/1988 | Yananton | 119/169 |
| 4,800,677 | A * | 1/1989 | Mack | 119/171 |
| D307,201 | S * | 4/1990 | Gold | D30/161 |
| 4,913,954 | A | 4/1990 | Mack | |
| 5,080,046 | A * | 1/1992 | Cassone | 119/168 |
| 5,482,007 | A | 1/1996 | Kumlin | |
| 5,630,376 | A * | 5/1997 | Ochi et al. | 119/169 |
| 5,715,772 | A * | 2/1998 | Kamrath et al. | 119/169 |
| 5,797,347 | A * | 8/1998 | Ochi | 119/169 |
| 5,819,688 | A | 10/1998 | Walker | |
| 6,059,247 | A * | 5/2000 | Olivadoti | 248/346.04 |
| 6,079,363 | A * | 6/2000 | MacLaine | 119/161 |
| 6,129,050 | A * | 10/2000 | Carbajal | 119/165 |
| 6,244,216 | B1 * | 6/2001 | Ochi | 119/171 |
| 6,295,658 | B1 | 10/2001 | Jenkins | |
| 6,460,484 | B2 | 10/2002 | Ikegami et al. | |
| 6,550,423 | B1 * | 4/2003 | Pope | 119/161 |
| 6,553,938 | B2 | 4/2003 | Ikegami et al. | |
| 2005/0166855 | A1 | 8/2005 | Kaneko et al. | |
| 2006/0156992 | A1 * | 7/2006 | Costa | 119/161 |

FOREIGN PATENT DOCUMENTS

| | | | |
|---|---|---|---|
| FR | 2599585 | * | 12/1987 |
| JP | 2006014727 A | * | 1/2006 |

OTHER PUBLICATIONS

English translation of French Patent FR 2599585 to Genevieve Valenta published Dec. 11, 1987.*

* cited by examiner

*Primary Examiner* — David Parsley
(74) *Attorney, Agent, or Firm* — Brinks Hofer Gilson & Lione

(57) ABSTRACT

A small animal toilet pad that includes a base and one or more walls that extend upward from the base to protect floors, and adjacent walls, furniture and other objects from damage associated with animal and pet toilet habits. The base and wall(s) can be made from conventional liquid absorbent materials and can be in the form of woven or non-woven fabrics or webs, or laminated pads, mats sheets, etc. The base and/or wall(s) can include or contain stiffeners such as plastic panels, laminates or coatings, water proofed paper or cardboard panels, or similar reinforcing or stiffening elements whether as a continuous structure, grid, frame, etc. Alternatively, the wall(s) can be supported to adjacent structures by clips, hooks, ties, etc.

20 Claims, 5 Drawing Sheets

SMALL ANIMAL TOILET PAD

TECHNICAL FIELD

The present invention relates to small domestic animal and pet care products and more particularly to an absorbent articles for managing animal and pet wastes and for protecting floors, walls and other objects from damage associated with animal and pet toilet habits.

BACKGROUND ART

The domestication or keeping small animals such as ferrets, rabbits, guinea pigs, etc. as household pets inside houses and apartments typically involves keeping them in cages and/or allowing them to roam free in indoor areas part or all of the time.

Attempts to domesticate small animals encounter problems with the tendency of many small animals to urinate and/or defecate onto the floor and/or vertical surfaces in corners formed from any object such as cage corners, furniture, household objects, and/or walls or any combination of such places/surfaces.

"Toilet training" involves teaching small animals or pets to urinate and defecate in a particular place such as in a litter box that can contain absorbent materials that different small animals or pets have a preference to urinate or defecate into. Although some small animals or pets can be toilet trained over time, a general cross section of these small animals go to the toilet in a number of various locations on an irregular time schedule without the ability to reliably indicate to their owners when they wish to do so or without having the ability or inclination to wait to go to the toilet in a more suitable location or time.

Due to these reasons, owners wishing to keep these small animals as pets prefer to employ a method to contain the animal waste for later disposal and/or to protect floors and other household objects from being soiled and or damaged when the animal goes to the toilet.

If a small animal or pet uses a common area as a toilet, constant cleaning of the area may be needed to remove the animal wastes and to remove or neutralize the odor. Otherwise, the area can become offensive to the inhabitants of the house/apartment and may cause the animal to locate a clean location for the next toilet cycle.

Modem society is constantly searching for a more effective way to cohabitate with small animals as pets and to reduce the handling/cleaning up of animal wastes and or soiled/stains floors or wall surfaces.

The present invention provides a disposable, easy to use solution for small animal waste that can be used with or without existing containers and which eliminates the need for current litter products that have drawbacks in their use both for the pet owner and for the pet themselves.

Among other features, the present invention can be used to enhance, replace, or compliment current products that are designed or used for small animal waste management or toilet products or animal litter products/litter containers or pan or boxes for any small animal that uses a corner location for the purpose of going to the toilet.

DISCLOSURE OF THE INVENTION

According to various features, characteristics and embodiments of the present invention which will become apparent as the description thereof proceeds, the present invention provides an absorbent article for use as a small animal toilet pad which comprises:

a substantially flat base that includes a peripheral edge and comprises a liquid absorbent material; and at least one vertical panel that extends upward from a portion of the peripheral edge of the substantially flat base and which at least one vertical panel comprises a liquid absorbent material, wherein said at least one vertical panel includes at least end portions that are substantially aligned at 90 degrees from one another.

BRIEF DESCRIPTION OF DRAWINGS

The present invention will be described with reference to the attached drawings which are given as non-limiting examples only, in which.

BEST MODE FOR CARRYING OUT THE INVENTION

Figure 1:
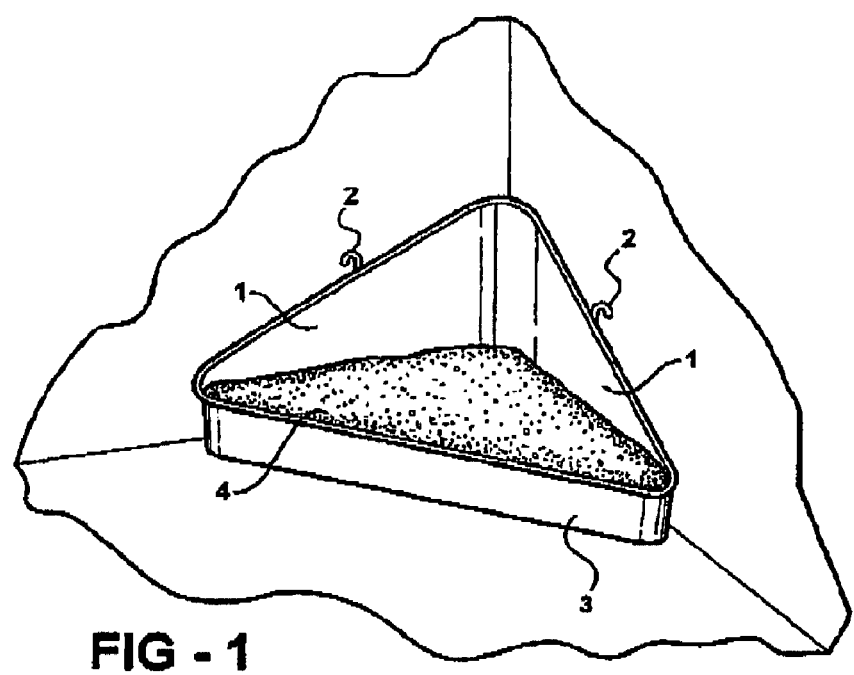
FIG. 1 is a perspective drawing of a conventional corner pet litter container.

The present invention is directed to absorbent articles for managing animal and pet wastes and for protecting floors, walls and other objects from damage associated with animal and pet toilet habits. The present invention is more particularly directed to a small animal toilet pad (SATP) that is configured to protect the surface upon which the pad is placed and adjacent vertical surfaces or articles such as the sides of a cage, furniture, walls, etc.

The small animal toilet pads include a base and one or more walls that are coupled to the base and are configured to extend or stand upright with respect to the base. The base and wall(s) are made from conventional liquid absorbent materials and include liquid-impermeable outer surfaces and liquid-permeable inner surfaces. The base and wall(s) can be in the form of woven or non-woven fabrics or webs, or laminated pads, mats sheets, etc. The base and/or wall(s) can include or contain stiffeners such as plastic panels, laminates or coatings, water proofed paper or cardboard panels, or similar reinforcing or stiffening elements whether as a continuous structure, grid, frame, etc.

The wall(s) can also be supported to adjacent structures by clips, hooks, ties, etc.

The small animal toilet pads can be used separately from or in conjunction with litter containers. When used in conjunction with litter containers, the small animal toilet pads function as liners for the litter containers.

The invention will be described with reference to the attached drawings in which common reference numerals have been used to identify similar elements when possible.

FIG. 1 is a perspective drawing of a conventional corner pet litter container. The litter container depicted in FIG. 1 includes rear vertical walls 1 that are configured to fit in the corner of a cage and can include hooks 2 to secure the litter container to sides of a cage near a corner of the cage. The front of the container is provided with an entrance wall 3 that is tall enough to contain loose absorbent litter material in the container and short enough to allow a small animal to easily climb or step over the entrance wall 3. As shown, the rear vertical walls 1 are taller in the center and slop upward from their junction with the entrance wall 3. The container shown in FIG. 1 can be placed in a corner outside a cage when small pets are allowed to roam freely. These containers are designed to contain absorbent pellets or granular material 4 (referred to as "litter") which is removed and disposed of when it becomes soiled.

Use of the litter container depicted in FIG. 1 involves the need to scoop out and dispose of some or all of the litter material each time it becomes soiled. This cleaning process requires that the person performing the task to be in close proximity to or even in contact with the soiled litter and often to handle the litter at close quarters. During the cleaning process can become difficult to separate and non-soiled litter from soiled litter which is being removed so that if often become necessary to remove and discard excess litter ensure cleanliness.

Because current litter products are commonly made from materials such as clay they can be relatively heavy and release dust when poured from a storage package into a litter container. Moreover, since the litter material is loose, it often becomes spread outside the litter pan as an animal instinctively buries fecal matter or cover urine in the litter. Sometimes certain animals develop health and respiratory problems due to adverse reactions to litter products. In addition, some veterinarians may recommend not using litter products when animals become sick or are recovering from injuries due to the risk of infection.

Although the shape of the litter container shown in FIG. 1 offers protection for the wall or vertical surfaces behind the container, the litter is only contained in the lower portion of the container and the rear vertical walls must be cleaned using cleaning product as a separate process. Removal of just the soiled litter after use by a small animal does not ensure cleanliness of the litter container due to the soiling of the unprotected rear vertical walls and even surfaces of the entrance wall.

To be effective, litter containers must be used in every location where small animals may go to the toilet if a broad range of protection is required. This is especially true during the initial toilet training phase when an animal's owner may have a preferred location for a litter box, but the animal fails or is slow to respond to toilet training. Due to this requirement, a small animal's owner can often find is necessary to purchase several relatively expensive litter containers that may only be required for a short length of time.

Prior art corner litter containers are made to suit placement in a single corner of a cage and are typically sized so that only one corner can be protected in a normal cage. If an animal chooses not to use such a litter container, it can easily go to the toilet in an adjacent, unprotected corner that is usually on an opposite end of a cage than then animal's bedding area. Prior art corner litter containers are also bulky and are not designed to be compacted or reduced in size for travel purposes or storage.

Figure 2:
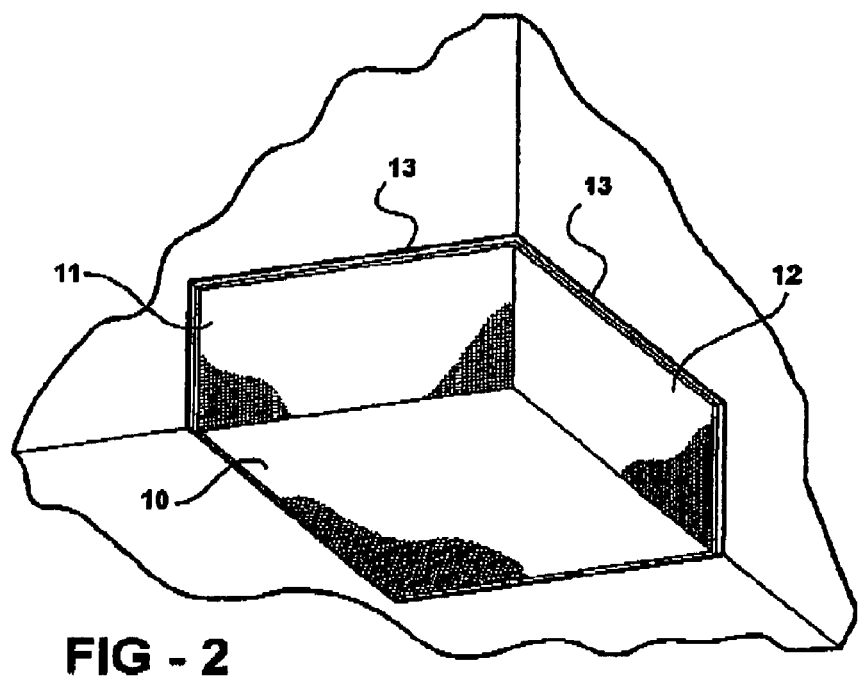
FIG. 2 is a perspective view of a small animal toilet pad according to one embodiment of the present invention.

FIG. 2 is a perspective view of a small animal toilet pad according to one embodiment of the present invention. The small animal toilet pad (SATP) depicted in FIG. 2 comprises a substantially flat base 10 having two vertical panels 11 and 12 extending upward from adjacent sides of the base 10. Both the base 10 and vertical panels 11 and 12 are made from or comprise an absorbent material. For example, the base 10 and vertical panels 11 and 12 each can comprise a sheet, laminate or multi-layered construction of a material that is known to absorb liquids such as urine. The bottom surface of the base 10 and outer surfaces of the vertical panels 11 and 12 can comprise any known liquid-impermeable material, including plastic layers or films, liquid-impermeable woven or nonwoven fabrics, liquid-impermeable coatings, etc. to prevent absorbed liquid from transferring completely through the base 10 and vertical panels 11 and 12 and wetting surfaces that are intended to be protected by the small animal toilet pad.

Suitable absorbent structures for the base 10 and vertical panels 11 and 12 include those that are generally known in the art of absorbent articles, including urine-absorbing bed pads, diapers, sanitary pads, incontinence articles and pet toilet sheets or mats or pads, as exemplified by U.S. Pat. No. 2,788,003 to Morin, U.S. Pat. No. 3,284,273 to Prentice, U.S. Pat No. 3,626,899 to Spellman, U.S. Pat No. 4,800,677 to Mack, U.S. Pat. No. 5,630,376 to Ochi et al., U.S. Pat. No. 6,059,247 to Olivadoti, U.S. Pat. No. 6,295,658 to Jenkins, U.S. Pat. No. 6,460,848 to Ikegami et al. and U.S. Pat. No. 6,553,938 to Ikegami et al. Of these, pet toilet sheets that are designed for use with pets have exposed surfaces that generally resist damage when an animal might try to bury or cover urine and/or solid wastes. Absorbent articles which are not specifically designed for use with pets could be easily provided with a liquid-permeable, damage resistant covering or top layer. The structure of any of the above-referenced absorbent articles can be suitable reinforced by incorporating a rigid panel within or on an outer surface of the base 10 and/or vertical panels 11 and 12. In alternative embodiments, the base 10 and vertical panels 11 and 12 can be made from or comprise a rigid sheet of a material that is known to absorb liquids. For example, the base 10 and vertical panels 11 and 12 could be made from a compressed fibrous or cellulose material or the like that is provided with a liquid-impermeable backing. Such a structure which would be rigid enough for the vertical panels 11 and 12 to remain upright would absorb urine and be economically disposable. Other types of known absorbent materials could be used including superabsorbent polymers that can be incorporated into woven and nonwoven sheets, layers, webs, etc. in known manners and which can also be incorporated into fibers that are used to form woven and nonwoven sheets, layers, webs, etc. In essence, the present invention involves the use of any conventional liquid absorbent mat, pad, sheet or similar article in the unique structure of a small animal toilet pad that is configured, according to various embodiments, to protect a corner area where small animals are inclined to go to the toilet.

In use, a small animal backs into the small animal toilet pad depicted in FIG. 2 and typically goes to the toilet against or near the vertical panels 11 and 12. As a result, urine is absorbed both by the base 10 and vertical panels 11 and 12, and prevented from wetting the floor beneath base 10 and surfaces behind the vertical panels 11 and 12. After one or more uses, the small animal toilet pad can be discarded and replaced. In FIG. 2 reference numeral 13 identifies a stiffener material that is attached to the back of vertical panels 11 and 12 to aid in the freestanding nature of the small animal toilet pad. Such a stiffener can comprise a plastic panel, laminate or coating, a water proofed paper or cardboard panel, or similar reinforcing or stiffening element whether as a continuous structure, grid, frame, etc.

Figure 3:
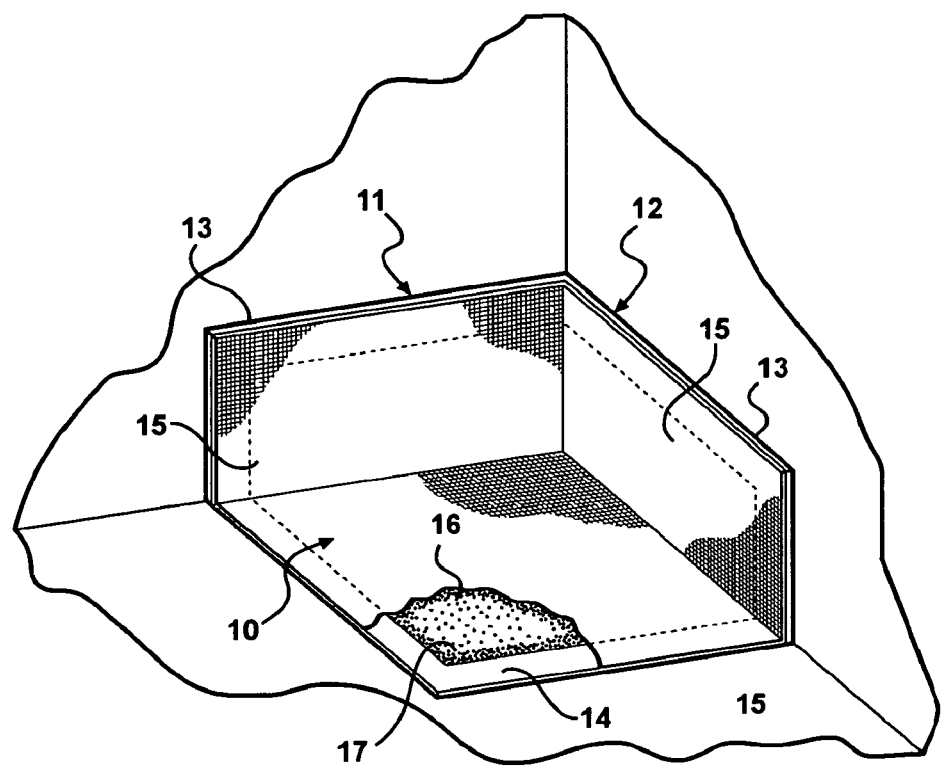
FIG. 3 is a partially cut-away perspective view of a small animal toilet pad according to another embodiment of the present invention.

FIG. 3 is a partially cut-away perspective view of a small animal toilet pad according to one embodiment of the present invention. The small animal toilet pad (SATP) depicted in FIG. 3 includes a base 10 and vertical panels 11 and 12 that comprise a liquid-impermeable backsheet 14, a liquid-permeable topsheet 15 and a core or layer of an absorbent material 16 between the liquid-impermeable backsheet 14 the liquid-permeable topsheet 15. The liquid-impermeable backsheet 14 and liquid-permeable topsheet 15 can be made from any type of liquid-impermeable and liquid-permeable materials that are known in the art of absorbent articles discussed above or herein. The absorbent material 16 can likewise comprise any known type of liquid-absorbent material known in the art of absorbent articles discussed above or herein, including known water absorption polymers, fluffy pulp, wadding, foamed materials, cross-linked cellulose fibers, etc. This multi-layered construction of the small animal toilet pad shown in FIG. 3 can be made from a variety of known materials, using fabrication techniques that are well known in the art of absorbent articles.

The absorbent material 16 can include a scented material 17 that will attract a general or a specific targeted small animal to the small animal toilet pad. In FIG. 3 reference numeral 13 identifies a stiffener material that is attached to the back of vertical panels 11 and 12 to aid in the freestanding nature of the small animal toilet pad. Such a stiffener can comprise a plastic panel, laminate or coating, a water proofed paper or cardboard panel, or similar reinforcing or stiffening element whether as a continuous structure, grid, frame, etc.

Figure 4:
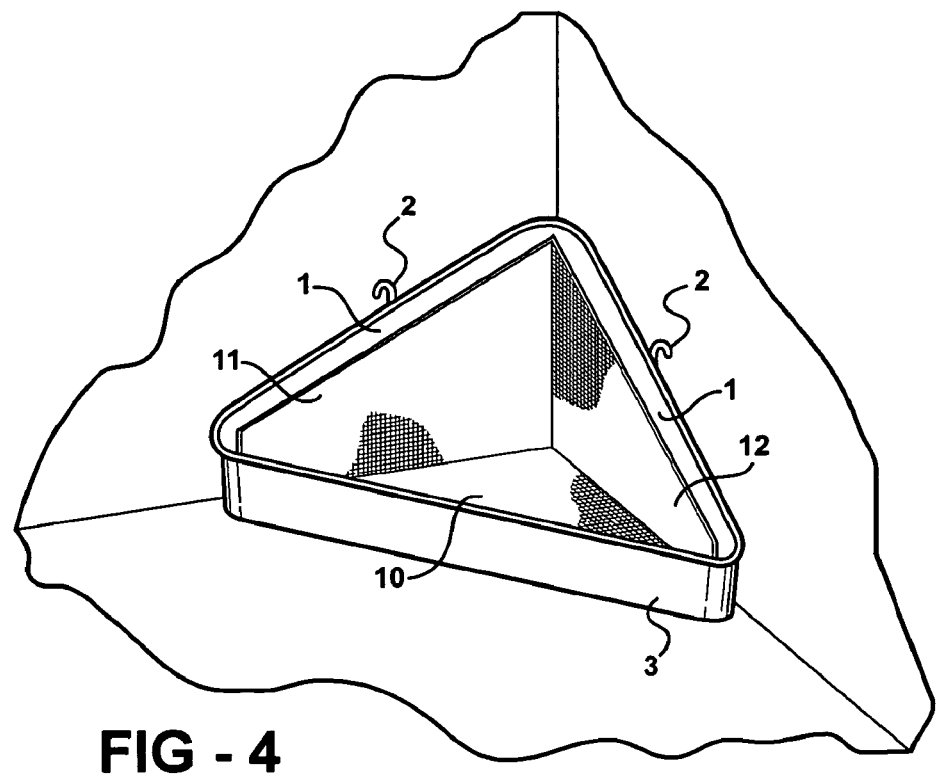
FIG. 4 is a perspective view of a small animal toilet pad according to another embodiment of the present invention that is used as a litter container liner.

FIG. 4 is a perspective view of a small animal toilet pad according to one embodiment of the present invention that is used as a litter container liner. The small animal toilet pad (SATP) shown in FIG. 4 is depicted as being used as a liner in a conventional corner litter container. As depicted, the small animal toilet pad includes a base 10 and vertical panels 11 and 12 which are configured to fit inside and line the bottom and at least the rear walls 1 of a conventional corner litter container. The base 10 and vertical panels 11 and 12 can be similar to either of the embodiments depicted and discussed above in reference to FIGS. 2 and 3 or otherwise discussed herein. The embodiment of the invention depicted in FIG. 4 allows a conventional corner litter container to be used without a loose litter material. Moreover, the use of the small animal toilet pad allows the litter container to be easily cleaned by merely removing and replacing the small animal toilet sheet which functions as a liner. Alternatively, a loose litter material can be used when using the small animal toilet pad as a liner, in which case a smaller amount of loose litter material can be used which will be easier to clean up and more cost efficient.

Figure 5:
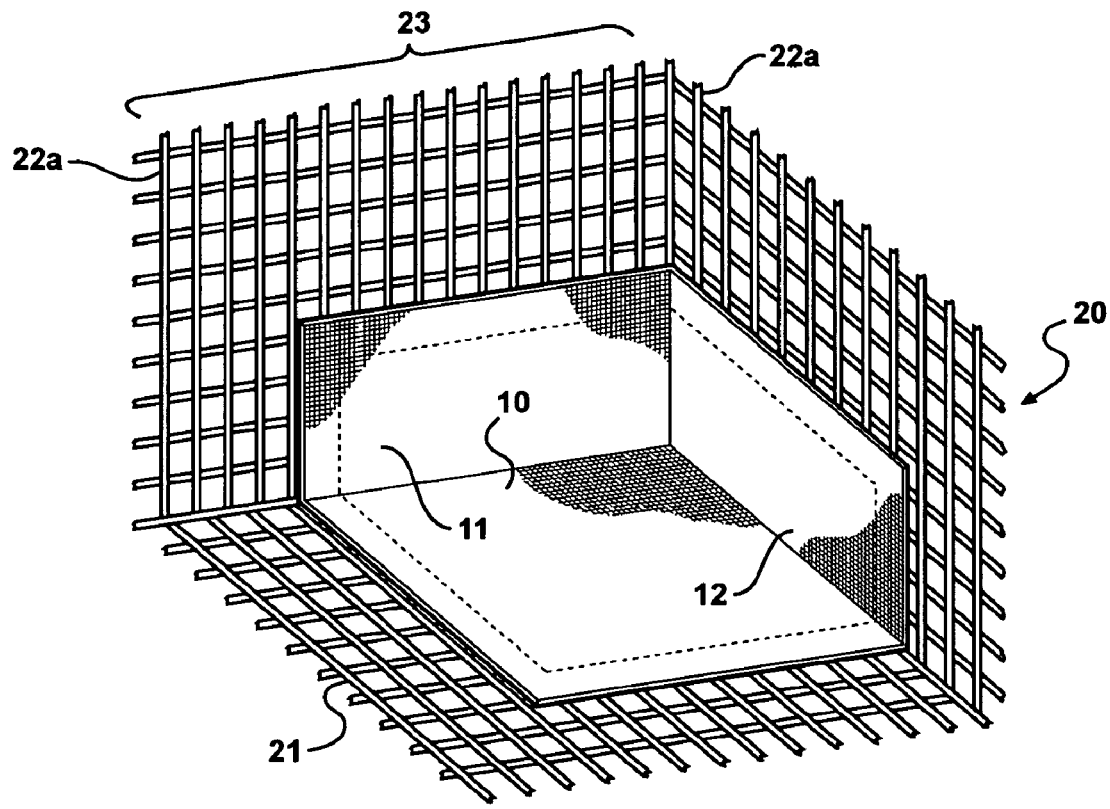
FIG. 5 is a perspective view of a small animal toilet pad according to another embodiment of the present invention that is used in a cage.

FIG. 5 is a perspective view of a small animal toilet pad according to one embodiment of the present invention that is used in a cage. The small animal toilet pad (SATP) shown in FIG. 5 is depicted as being position in the corner of a cage 20. As in the other embodiments, the small animal toilet pad includes a base 10 and vertical panels 11 and 12. The base 10 and vertical panels 11 and 12 can be similar to either of the embodiments depicted and discussed above in reference to FIGS. 2 and 3 or otherwise discussed herein. In this embodiment, in addition to strengthening or reinforcing the vertical panels 11 and 12, the base 10 of the small animal toilet pad can be reinforced in a manner similar (as discussed herein) to so that it will be sufficiently supported across the bars 21 that define the bottom of the cage 20. When the small animal toilet pad is placed in a cage 20 as shown in FIG. 5 it protects both the cage bottom (including any bedding material) and the vertical bars 22 of the walls of the cage 20. A stiffener material, as discussed above, can be attached to the back of or incorporated into the vertical panels 11 and 12 and/or the bottom of base 10 to reinforce the base 10 and assist in the maintaining the vertical panels 11 and 12 upright. Such a stiffener can comprise a plastic panel, laminate or coating, a water proofed paper or cardboard panel, or similar reinforcing or stiffening element whether as a continuous structure, grid, frame, etc. It is also possible to provide clips, hooks, ties, etc. on the vertical panels 11 and 12 to secure them in place against the walls 23 of the cage 20.

Figure 6:
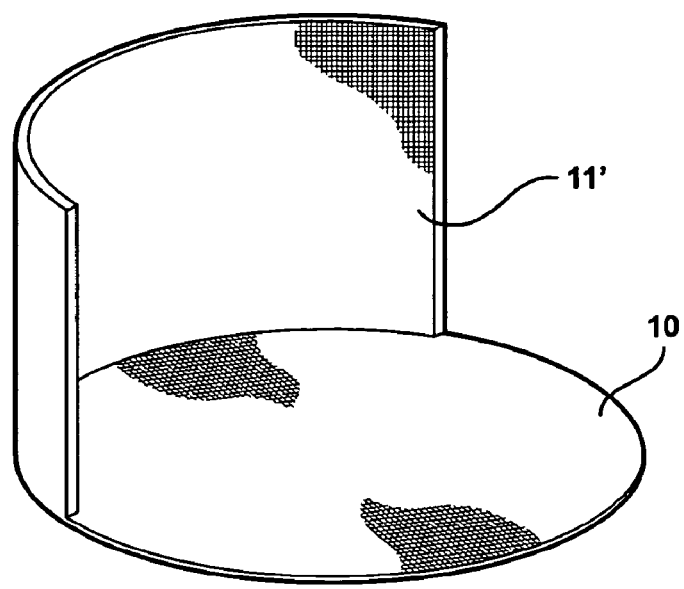
FIG. 6 is a perspective view of a small animal toilet pad according to another embodiment of the present invention.

FIG. 6 is a perspective view of a small animal toilet pad according to one embodiment of the present invention. The small animal toilet pad (SATP) shown in FIG. 6 includes a substantially circular base 10 and a single curved vertical panel 11' that extends upward from the base 10.

Figure 7:
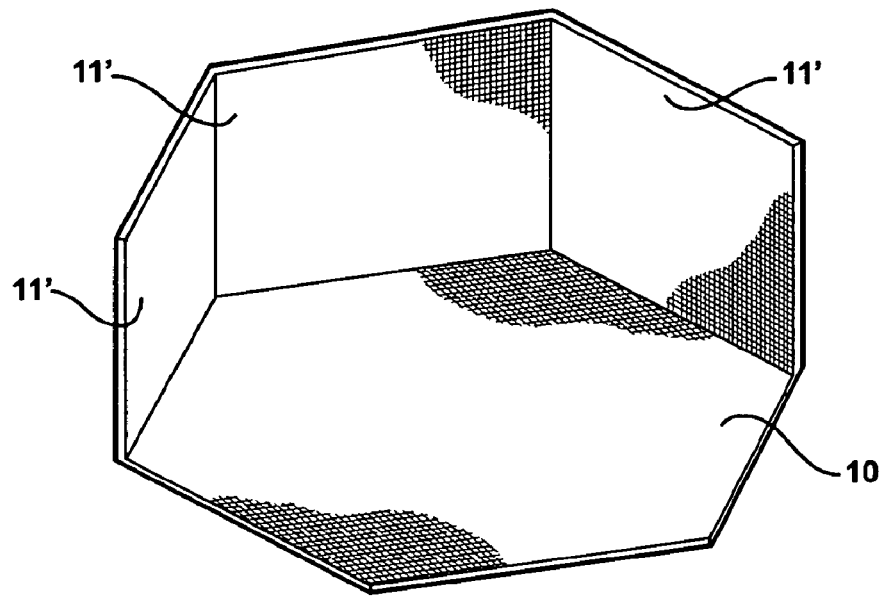
FIG. 7 is a perspective view of a small animal toilet pad according to another embodiment of the present invention.

FIG. 7 is a perspective view of a small animal toilet pad according to one embodiment of the present invention. The small animal toilet pad (SATP) shown in FIG. 7 includes a base 10 that is in the shape of a polygon and a plurality of vertical panels 11' that extend upward from the linear side edges of the base 10. In the illustrated embodiment, the base has six sides. However, it to be understood that the base 10 can have five, six, seven or more sides as desired. The base 10 can have virtually any shape that provides for vertical panels 11' to extend upward from a back portion thereof, including a parallelogram shape, a triangular shape of any curved shape or combination of curved and/or linear shapes. The base 10 and vertical panels 11 can be similar to any of the embodiments depicted and discussed above. Moreover, stiffener material, as discussed above, can be attached to the back of or incorporated into the vertical panels 11' and/or bottom of base lo to reinforce the base 10 and assist in the maintaining the vertical panels 11' upright.

Figure 8:
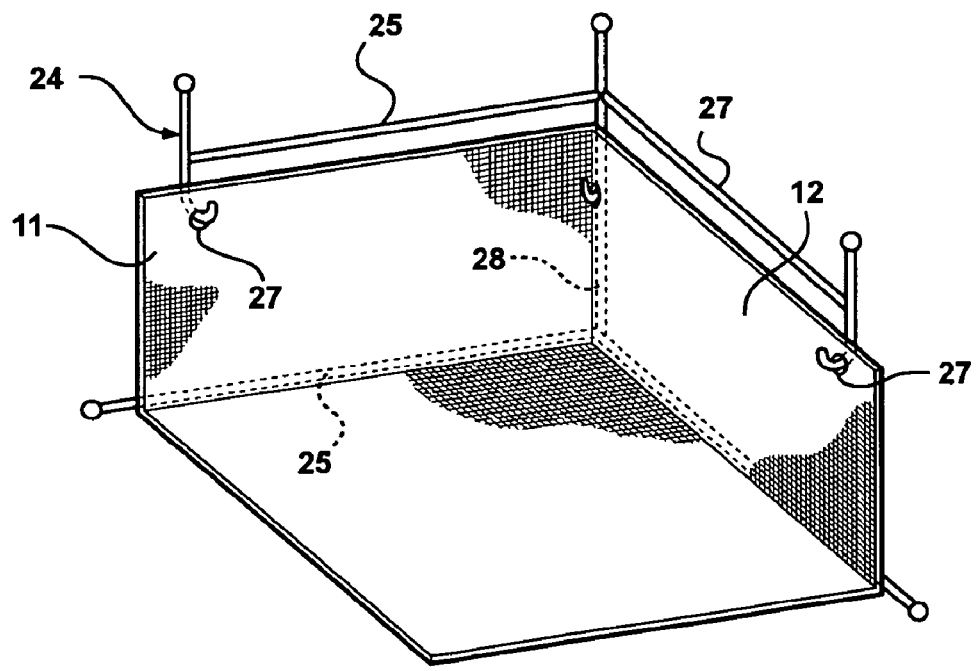
FIG. 8 is a perspective view of a small animal toilet pad according to one embodiment of the present invention.

FIG. 8 is a perspective view of a small animal toilet pad according to one embodiment of the present invention. The small animal toilet pad (SATP) shown in FIG. 8 includes a base 10 and vertical panels 11 and 12 which can be configured similar to any of the embodiments discussed above and can comprise any of the type of absorbent material discussed above. The small animal toilet pad shown in FIG. 8 also includes a supporting frame 24 that is configured to extend behind the vertical panels 11 and 12 as shown in FIG. 8 and support the vertical panels 11 and 12 so as to maintain the vertical panels 11 and 12 in an upright position as depicted. The embodiment of the frame 24 shown in FIG. 8 includes a lower portion 25 that forms an angled base to support the frame 24 and an upper portion 26 that can include hooks 27 that secure the vertical panels 11 and 12 in an upright position. In the embodiment depicted in FIG. 8, the upper portion 26 of frame 24 is supported on the lower portion 25 by a single support member 28 that is provided at the intersection of the vertical panels 11 and 12. In alternative embodiments, the frame 24 can include any number of support members between the upper and lower portions 26 and 27. Moreover, the frame 24 is not limited to any particular shape so long as it functions to secure the vertical panels 11 and 12 in an upright position. In this regard, the frame 24 or any portion thereof could extent beneath the base 10.

The vertical panels 11 and 12 can be provided with cutouts, notches, loops, etc. to which the hooks 27 can engage the panels 11 and 12. Alternatively, the hooks 27 could press the vertical panels 11 and 12 against another portion of the frame 24 provided behind the vertical panels 11 and 12. In further embodiments, clips, ties, snaps, Velcro fasteners or other devices can be used to secure the vertical panels 11 and 12 to the upper portion 26 of the frame 24. In other embodiments, hooks, clips, ties, snaps, Velcro fasteners or other devices can be temporally provided on walls or other objects that are adjacent to the small animal toilet pad.

Figure 9A:
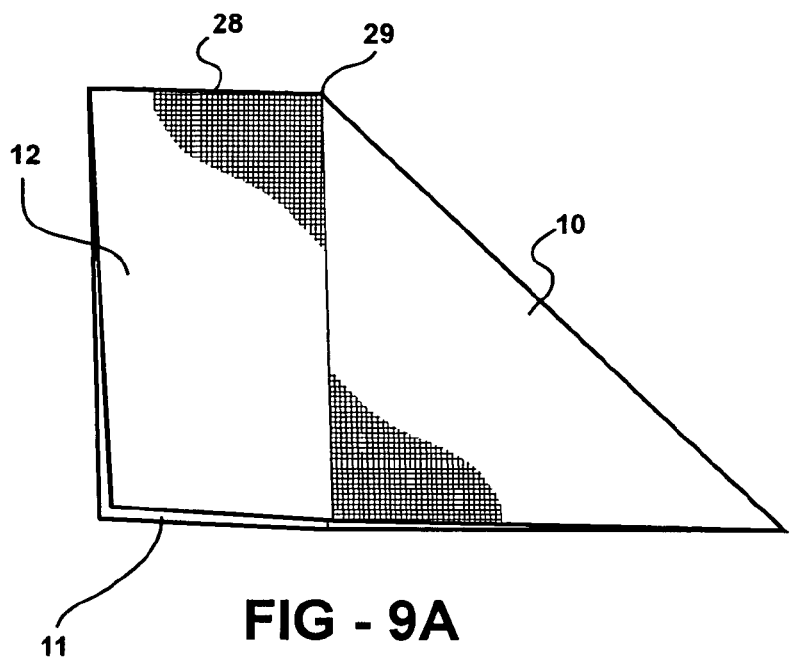
FIGS. 9a-9c depict one manner in which the small animal toilet pad of the present invention is capable of being folded for sale packaging, storage, travel, etc.
Figure 9B:
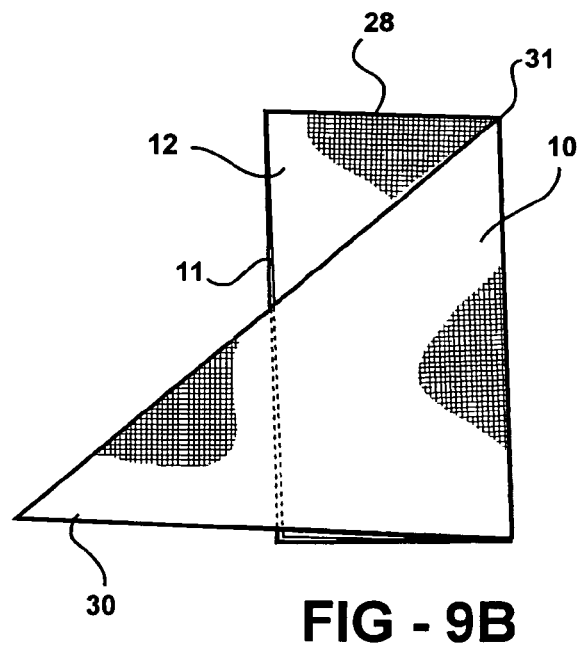
Figure 9C:
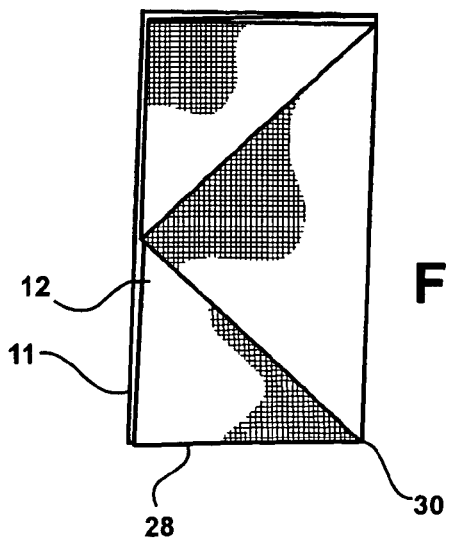

FIGS. 9a-9c depict one manner in which the small animal toilet pad of the present invention is capable of being folded for sale packaging, storage, travel, etc.

In the embodiment of the small animal toilet pad depicted in FIGS. 9a-9c, is similar to that shown and discussed in reference to FIG. 2 above. In this embodiment, the base 10 is substantially non-rigid so that it can be folded in any desired configuration. The vertical panels 11 and 12 can be rigid or reinforced by the use of a stiffener as discussed above. In this regard, as will be understood, the vertical panels 11 and 12 depicted in FIGS. 9a-9c are folded together at their junction 28, but otherwise are not individually folded. If the vertical panels 11 and 12 were non-rigid and foldable, it can be readily understood that there are many other manners in which the small animal toilet pads can be folded.

In FIG. 9a the vertical panels 11 and 12 are folded at their junction 28 so as to superimpose one another. At the same time, the base 10 is folded diagonally in half Next, as shown in FIG. 9b the folded base 10 is folded over the bottom edge 29 of the vertical panel 12. Next, the corner 30 of the folded base 10 shown in FIG. 9b is either wrapped around the superimposed vertical panels 11 and 12, or folded back to corner 31 shown in FIG. 9b.

In other embodiments in which the vertical panels comprise more that two sections (e.g. FIG. 7) the individual panels can be folded together at their junctions and the resulting folded base can be folded or wrapped around the folded vertical panels.

Other manners of folding the small animal toilet pads will be apparent to those skilled in the art from the description above.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

What is claimed is:

1. An absorbent article for use as a small animal toilet pad which comprises:
    a substantially flat base that includes an upper surface and a peripheral edge and comprises a liquid absorbent material; and
    at least one vertical panel that extends upward from a portion of the peripheral edge of the substantially flat base which portion of the peripheral edge is less than the entire peripheral edge of the peripheral edge of the substantially flat base and which at least one vertical panel includes an inner facing surface that faces the substantially flat base and comprises a liquid absorbent material, wherein said at least one vertical panel has a vertical height that is substantially greater than a thickness of the at least one vertical panel, the at least one vertical panel includes an exposed vertical surface for receiving and absorbing liquids and wherein at least end portions that are substantially aligned at an angle a from one another, wherein the angle $\alpha$ is 90° and,
    wherein each of: i) the upper surface of the substantially flat base can be folded onto itself, ii) the upper surface of the substantially flat base can be folded onto the inner facing surface of the at least one vertical panel, and iii) the inner facing surface of the at least one vertical panel can be folded onto itself, all without forming a sealed connection.

2. An absorbent article for use as a small animal toilet pad according to claim 1, wherein the peripheral edge of the substantially flat base having an arcuate segment; and
    the at least one vertical panel comprises a curved panel.

3. An absorbent article for use as a small animal toilet pad according to claim 1, wherein said at least one vertical panel comprises two vertical panels that comprise a liquid absorbent material.

4. An absorbent article for use as a small animal toilet pad according to claim 3, wherein the two vertical panels are coupled together at a junction about which the two panels can be folded to superimpose one another.

5. An absorbent article for use as a small animal toilet pad according to claim 1, wherein said at least one vertical panel comprises more than two vertical panels that comprise a liquid absorbent material and the angle a between adjacent ends of the vertical panels is greater than 90°.

6. An absorbent article for use as a small animal toilet pad according to claim 5, wherein adjacent ones of the more than two vertical panels are coupled together at junctions about which adjacent ones of the more than two panels can be folded to superimpose one another.

7. An absorbent article for use as a small animal toilet pad according to claim 1, wherein said base and said at least one vertical panel are each non-rigid.

8. An absorbent article for use as a small animal toilet pad according to claim 1, wherein said at least one vertical panel is sufficiently rigid to stand upright.

9. An absorbent article for use as a small animal toilet pad according to claim 8, wherein said at least one vertical panel is provided with a stiffener so as to be rigid.

10. An absorbent article for use as a small animal toilet pad according to claim 1, wherein at least one of the base and the at least one vertical panels comprises a multi-layered structure.

11. An absorbent article for use as a small animal toilet pad according to claim 10, wherein the multi-layered structure comprises a liquid-pervious topsheet, a liquid-impervious bottom sheet and a liquid absorbent material between the liquid-pervious topsheet and the liquid-impervious bottom sheet.

12. An absorbent article for use as a small animal toilet pad according to claim 1, further comprising a frame that supports the at least one vertical panel in an upright position.

13. An absorbent article for use as a small animal toilet pad according to claim 12, wherein the frame has a lower portion that extends along a lower portion of the at least one vertical panel.

14. An absorbent article for use as a small animal toilet pad according to claim 1, wherein the base is substantially rectangular.

15. An absorbent article for use as a small animal toilet pad according to claim 12, wherein the base is substantially square.

16. An absorbent article for use as a small animal toilet pad according to claim 1, wherein the base is substantially circular.

17. An absorbent article for use as a small animal toilet pad according to claim 1, wherein the base is substantially polygonal.

18. An absorbent article for use as a small animal toilet pad according to claim 1, wherein the at least one vertical panel is configured to be secured to an adjacent supporting structure.

19. An absorbent article for use as a small animal toilet pad according to claim 18, wherein the at least one vertical panel is provided with at least one hook, tie or clip receiving structures or hooks, ties or clips to secure the at least one vertical wall to an adjacent supporting structure.

20. An absorbent article for use as a small animal toilet pad according to claim 1, wherein at least a portion of the base or at least one vertical panel is provided with a chemical scent to attract an animal.

\* \* \* \* \*

UNITED STATES PATENT AND TRADEMARK OFFICE
CERTIFICATE OF CORRECTION

Page 1 of 1

PATENT NO. : 8,336,497 B2
APPLICATION NO. : 11/336513
DATED : December 25, 2012
INVENTOR(S) : Linda Joy vanZuilekom It is certified that error appears in the above-identified patent and that said Letters Patent is hereby corrected as shown below:

Column 8, Line 1 should be changed from
   "stantially aligned at an angle a from one another,"
to
   --stantially aligned at an angle α from one another,--

Column 8, Line 2 should be changed from
   "wherein the angle αis 90° and,"
to
   --wherein the angle α is 90° and,--

Signed and Sealed this
Nineteenth Day of February, 2013

Teresa Stanek Rea
*Acting Director of the United States Patent and Trademark Office*